US012645600B2

(12) United States Patent
Li

(10) Patent No.: US 12,645,600 B2
(45) Date of Patent: Jun. 2, 2026

(54) ENHANCING METADATA STORAGE IN CACHES

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/945,662

(22) Filed: Nov. 13, 2024

(65) Prior Publication Data

US 2026/0133911 A1     May 14, 2026

(51) Int. Cl.
*G06F 12/00* (2006.01)
*G06F 12/084* (2016.01)
*G06F 12/0864* (2016.01)
*G06F 12/0873* (2016.01)
*G06F 12/0875* (2016.01)

(52) U.S. Cl.
CPC ........ *G06F 12/0873* (2013.01); *G06F 12/084* (2013.01); *G06F 12/0864* (2013.01); *G06F 12/0875* (2013.01)

(58) Field of Classification Search
CPC ............. G06F 12/0873; G06F 12/0875; H04L 67/2842
See application file for complete search history.

(56) References Cited

U.S. PATENT DOCUMENTS

| | | | |
|---|---|---|---|
| 9,081,805 B1 * | 7/2015 | Stamen ................ | G06F 21/602 |
| 10,108,669 B1 * | 10/2018 | Krishnamoorthy .......................... | |
| | | | G06F 16/24554 |
| 2008/0072540 A1 * | 3/2008 | Miller .................... | F04B 33/00 |
| | | | 53/403 |
| 2008/0162536 A1 * | 7/2008 | Becker ............... | G06F 16/2228 |
| | | | 707/999.102 |
| 2010/0030995 A1 * | 2/2010 | Wang ................. | G06F 16/2282 |
| | | | 711/E12.001 |
| 2019/0205459 A1 * | 7/2019 | Busjaeger ........... | G06F 16/2282 |

OTHER PUBLICATIONS

Zou et al.,("Isolated Storage of Multi-Tenant Data Based on Shared Schema", Cybernetic and Information Technologies 2016).*

* cited by examiner

*Primary Examiner* — Arvind Talukdar
(74) *Attorney, Agent, or Firm* — Fish & Richardson P.C.

(57) ABSTRACT

Methods, systems, and computer-readable storage media for storing, within a cache, a set of P byte arrays, a first byte array representing a map of a first plurality of entities of a first tenant associated with M entities, where M>P>1 and the set of P byte arrays are indexed by tenant and group identifier pairs, receiving a first request, the first request associated with a first entity, for the first entity, retrieving, from the cache, the first byte array by indexing at least a first subset of the P byte arrays using a tenant identifier of the first tenant and a first group identifier from a set of first group identifiers, generating a first map from the first byte array, the first map comprising first metadata that defines properties and logic associated with the first entity, and processing at least a portion of the first request using the first metadata.

20 Claims, 12 Drawing Sheets

*400*

Determine navigations
between entities — *402*

Divide entities into initial
groups based on navigations — *404*

Calculate query count of
relationship among entities in
each initial group — *406*

Selectively divide initial group(s) — *408*

Selectively combine initial group(s) — *410*

Return groups — *412*

Store metadata in cache using
(tenantID + groupID) as cache key — *414*

500

Receive request ⌐502

Determine entities implicated by request ⌐504

Determine group(s) ⌐506

Retrieve byte array(s) from cache ⌐508

Deserialize byte array(s) ⌐510

Retrieve metadata of entities from map ⌐512

Process request and return result ⌐514

ENHANCING METADATA STORAGE IN CACHES

BACKGROUND

Enterprises can use enterprise applications to support and execute operations. Enterprise applications can be deployed in cloud computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). In some instances, clients (e.g., client-side computing devices) transmit requests to a cloud computing environment, which requests are routed to a server for processing.

While multiple tenants will share common cloud computing resources, each tenant will have different needs and business processes. These differences can manifest themselves in different data structures and logic. As an example, what data fields constitute a user may vary from tenant to tenant and supporting these different data structures can consume a lot of computing resources.

SUMMARY

Implementations of the present disclosure are directed to enhancing storage of metadata in caches in cloud computing environments. More particularly, implementations of the present disclosure are directed to enhancing storage of tenant-specific metadata in caches of cloud computing environments.

In some implementations, actions include storing, within a cache, a set of P byte arrays where a first byte array in the set of P byte arrays is a representation of a map associated with a first plurality of entities where the first plurality of entities are associated with a first tenant and the first tenant is associated with M entities, where M>P>1 and the set of P byte arrays are indexed by tenant identifier and group identifier pairs, receiving a first request from the first tenant, the first request being associated with a first entity in the first plurality of entities, for the first entity in the first plurality of entities, retrieving, from the cache, the first byte array by indexing at least a first subset of the P byte arrays using a tenant identifier of the first tenant and a first group identifier from a set of first group identifiers wherein the first group identifier is associated with the first entity, generating a first map from the first byte array, the first map comprising first metadata that defines properties and logic associated with the first entity, and processing at least a portion of the first request using the first metadata. Other implementations of this aspect include corresponding systems, apparatus, and computer programs, configured to perform the actions of the methods, encoded on computer storage devices.

These and other implementations can each optionally include one or more of the following features: the first entity has an association to a second entity and the second entity is part of the first plurality of entities, the first map further including second metadata that defines properties and logic associated with the second entity and the processing at least a portion of the first request uses the second metadata; the first request is further associated with a second entity in a second plurality of entities further including for the second entity in the second plurality of entities, retrieving, from the cache, a second byte array by indexing at least a second subset of the P byte arrays using the tenant identifier and a second group identifier from the set of first group identifiers wherein the second group identifier is associated with the second entity, generating a second map from the second byte array, the second map including second metadata that defines properties and logic associated with the second entity, and processing the at least a portion of the first request further using the second metadata; the first entity is associated with a second entity in a second plurality of entities, actions further include, for the second entity in the second plurality of entities, retrieving, from the cache, a second byte array by indexing at least a second subset of the P byte arrays using the tenant identifier and a second group identifier from the set of first group identifiers wherein the second group identifier is associated with the second entity, generating a second map from the second byte array, the second map comprising second metadata that defines properties and logic associated with the second entity, and processing the at least a portion of the first request further using the second metadata; storing within the cache further includes receiving M entities, dividing the M entities into a set of initial groups so that each initial group comprises a sub-set of M entities, splitting at least one initial group into multiple initial groups, and storing a map that associates each of the M entities with one of the initial groups; actions further include merging at least two the initial groups into a single initial group; splitting the at least one initial group is executed in response to determining that the at least one initial group includes a number of entities that exceeds a threshold number of entities; splitting at least one initial group into multiple initial groups is executed using an undirected, weighted graph including vertices representing the M entities and edges representing relationships between the M entities, each edge having a weight determined by the relationship between two of the M entities; and the relationship between two of the M entities is determined from access logs.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
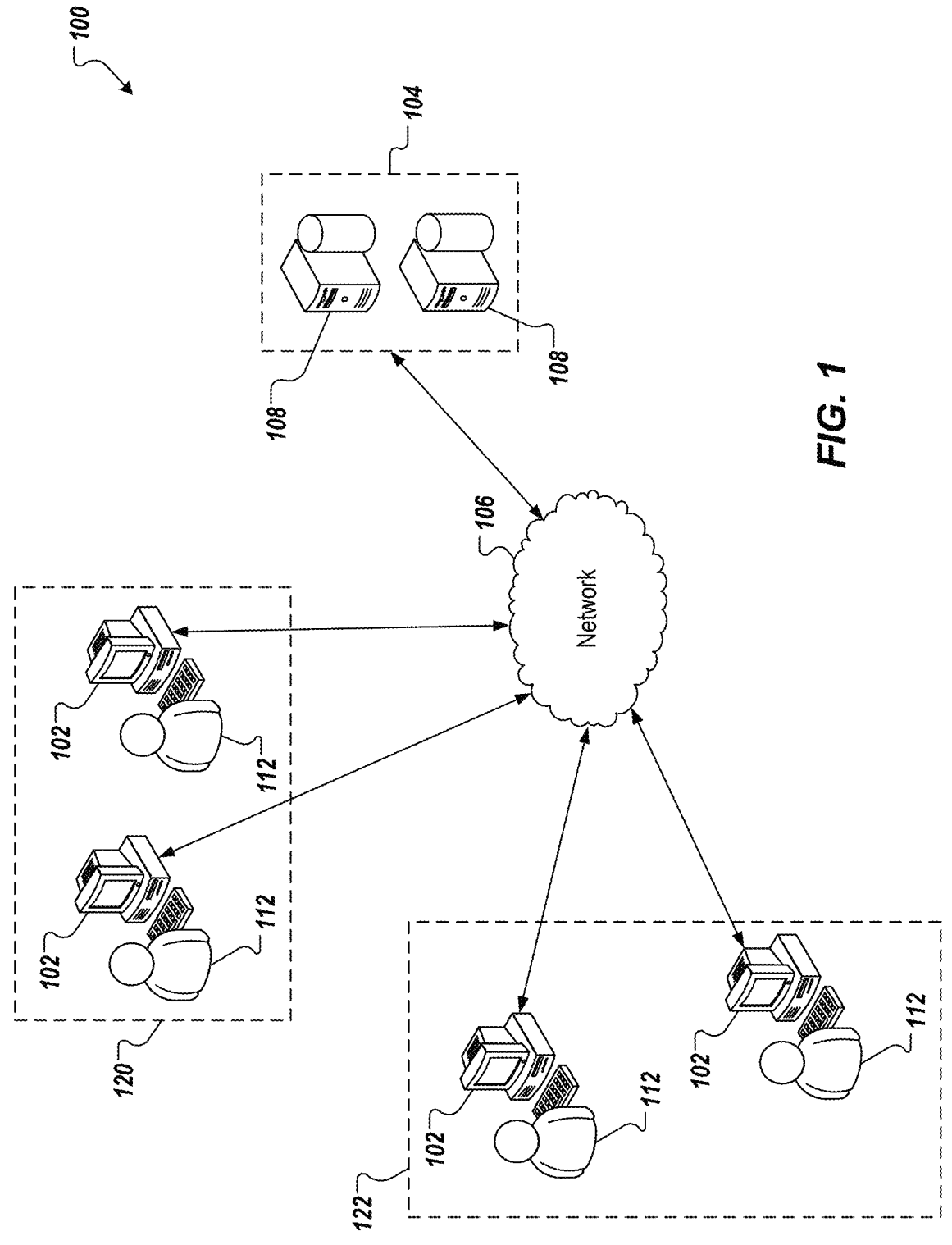
FIG. 1 depicts an example architecture that can be used to execute implementations of the present disclosure.

Implementations of the present disclosure are directed to enhancing storage of metadata in caches in cloud computing environments. More particularly, implementations of the present disclosure are directed to enhancing storage of tenant-specific metadata in caches of cloud computing environments. Implementations can include actions of storing, within a cache, a set of P byte arrays where a first byte array in the set of P byte arrays is a representation of a map associated with a first plurality of entities where the first plurality of entities are associated with a first tenant and the first tenant is associated with M entities, where M>P>1 and the set of P byte arrays are indexed by tenant identifier and group identifier pairs, receiving a first request from the first tenant, the first request being associated with a first entity in the first plurality of entities, for the first entity in the first plurality of entities, retrieving, from the cache, the first byte array by indexing at least a first subset of the P byte arrays using a tenant identifier of the first tenant and a first group identifier from a set of first group identifiers wherein the first group identifier is associated with the first entity, generating a first map from the first byte array, the first map comprising first metadata that defines properties and logic associated with the first entity, and processing at least a portion of the first request using the first metadata..

To provide further context for implementations of the present disclosure, and as introduced above, enterprises can use enterprise applications to support and execute operations. Enterprise applications can be deployed in cloud computing environments, which includes execution of the enterprise applications within a data center of a cloud-computing provider (e.g., as part of a infrastructure-as-a-service (IaaS) and/or a software-as-a-service (SaaS) offering). Cloud computing can be described as Internet-based computing that provides shared computer processing resources, and data to computers and other devices on demand. In cloud computing environments, applications can include multiple components that communicate with each other through web services of type REST (Representational state transfer) and/or OData (Open Data Protocol).

Enterprise applications can be deployed for access by multiple tenants. In some examples, each tenant can include an enterprise (e.g., a business or company) that is able to access the enterprise application in the cloud computing environment. For example, clients of tenants (e.g., individual employees of the business or company) can establish respective sessions, during which processing resources and bandwidth are consumed. A client can include, for example and without limitation, a user (e.g., an employee using a tenant-side computing device) or an application (e.g., executing on a tenant-side computing device). During a session, for example, a client is provided on-demand access to the enterprise application, which is executed using a shared pool of configurable computing resources (e.g., computer networks, servers, storage, applications, and services).

Multiple instances of an enterprise application can be executed on respective application servers within the cloud computing environment. For example, multiple tenants can access an enterprise resource planning (ERP) system, wherein instances of the ERP system are executing on multiple application servers. That is, multiple application servers execute respective instances of the same application (e.g., ERP system). As such, clients (e.g., tenant-side computing devices) transmit requests to the cloud computing environment, which requests are routed to one of the application servers for processing.

In cloud-based systems that support multiple tenants, each tenant has a different structure with different logic that is to be executed for the tenant. The data structure, corresponding data objects and associated logic are stored as tenant metadata that is tenant-specific. Consequently, different tenants have different tenant metadata for web services. The tenant metadata is required to guide the server-side in processing of requests from the client-side. Generally, tenant metadata contains entity definitions descriptive of 1) respective entities (e.g., data objects) and 2) coded logic that is executed to process the entities. For purposes of non-limiting illustration, an entity User can be considered and can include the metadata of Listing 1:

```
class User{
    String userId;
    String username;
    String firstName;
    String lastName;
    Date birthDate;
    Address address; //navigation property to entity
        Address
    Photo profile; //navigation property to entity Photo
    . . .
    //More properties. Different tenants may have different
        properties.
}
class UserService{
    User get(String userId){
    //Logic. Different tenants may have different logic.
    }
    Page<User> filter(String userId)){
    //Logic. Different tenants may have different logic.
    }
    User create(User user)){
    //Logic. Different tenants may have different logic.
    }
    boolean update(User user)){
    //Logic. Different tenants may have different logic.
    }
    . . .
}
```

Listing 1: Example Metadata for User Entity

In multi-tenant systems, all of the tenants can have the entity User, but there can be differences in property definitions and logic as between tenants. Hence, each tenant will have tenant-specific metadata that includes the properties and logic for the entity User that is specific to the respective tenant.

The cloud computing system needs to store tenant metadata for every tenant in a central cache (such as a Redis cluster). Complex cloud computing systems can contain dozens to hundreds of entities for each tenant. Going further, a cloud computing system that then supports dozens to hundreds of tenants can store large amounts of metadata to support all of the entities for all of the tenants. One approach to cache storage of this tenant-specific data uses a map to store the metadata of all of the entities for each of the tenants (e.g., if there are L tenants, there would be L maps or one map for each tenant). Here, the keys of each tenant specific map are the entity names and the values of the map are the metadata of respective entities. Each map is serialized to a byte array that is stored in the cache and uses tenant identifiers (tenantIDs) as the key. Each byte array is significantly smaller, in terms of memory footprint, than its corresponding map. Hence, using byte arrays conserves memory within the cache. It can be noted that, because the metadata contains logic, native serializers are required to serialize and deserialize the maps (e.g., in JDK platforms, the JDK serializer is used). In this example, metadata storage of multiple tenants can be represented in Table 1:

TABLE 1

Example Metadata Cache Storage (Store Complete Map)

| Cache Key (String, tenantID) | Cache Value (byte array) | |
|---|---|---|
| | a map with the structure | |
| tenant1 | key (String, entity name) | value (metadata of entity) |
| | entity1 | metadata of entity1 for tenant1 |
| | entity2 | metadata of entity2 for tenant1 |
| | entity3 | metadata of entity3 for tenant1 |
| | . . . | . . . |
| | a map with the structure | |
| tenant2 | key (String, entity name) | value (metadata of entity) |
| | entity1 | metadata of entity1 for tenant2 |
| | entity2 | metadata of entity2 for tenant2 |
| | entity3 | metadata of entity3 for tenant2 |
| | . . . | . . . |
| | a map with the structure | |
| tenant3 | key (String, entity name) | value (metadata of entity) |
| | entity1 | metadata of entity1 for tenant3 |
| | entity2 | metadata of entity2 for tenant3 |
| | entity3 | metadata of entity3 for tenant3 |
| | . . . | . . . |
| . . . | . . . | |

However, this approach to metadata storage presents several problems. For example, when a request is received that implicates a limited count of entities of a respective tenant (e.g., a request of the URL/rest/User?$expand=address,profile), the tenant's byte array of complete metadata, which includes the native serializer's additional libraries and contextual data, needs to be read from the cache to local memory, be deserialized back to the map, and the metadata of related entities (e.g., User, Address, Photo) retrieved from the map. The complete metadata, however, contains dozens to hundreds of entities for each tenant, which results in consumption of technical resources (processors, memory) to deserialize. This significantly diminishes the performance of the cloud computing system in terms of consumption of technical resources and latency.

To address this, another approach is to split the metadata of tenants into splices by entities and store the splices in the cache with the keys (tenantID+entity name) (e.g., if there are 10 tenants each with 10 entities, the system would have 100 splices in the cache). In this example, metadata storage of multiple tenants can be represented in Table 2:

TABLE 2

Example Metadata Cache Storage (Store by Entity)

| Cache Key (String, tenantID + entity name) | Cache Value (byte array) |
|---|---|
| tenant1, entity1 | metadata of entity1 for tenant1 |
| tenant1, entity2 | metadata of entity2 for tenant1 |
| tenant1, entity3 | metadata of entity3 for tenant1 |
| . . . | . . . |
| tenant2, entity1 | metadata of entity1 for tenant2 |
| tenant2, entity2 | metadata of entity2 for tenant2 |
| tenant3, entity3 | metadata of entity3 for tenant2 |
| . . . | . . . |
| tenant3, entity1 | metadata of entity1 for tenant3 |
| tenant3, entity1 | metadata of entity2 for tenant3 |
| tenant3, entity1 | metadata of entity3 for tenant3 |
| . . . | . . . |

Here, when a request implicates a limited count of entities of the tenant (e.g., a request of the URL/rest/User?$expand=address,profile), only the byte arrays of the implicated entities (e.g., User, Address, Photo) for that tenant need to be read from the cache to local memory and deserialized into metadata.

However, this approach to metadata storage also has problems. For example, because the metadata contains logic, as described earlier, a native serializer (native to the language that the logic is written in) is required. The native serializer (e.g., JDK serializer) stores languages-related information (e.g., common class definitions in JDK) in each byte array. As a result, all of the splices contain many duplicates of the languages-related information. Consequently, the total size of byte arrays of all of the splices is much larger than the size of the byte array of a map. To illustrate this, in an example cloud computing system, a tenant can have hundreds of entities. If the metadata for the tenant is stored as a complete map (e.g., as represented in Table 1), the total size is about 10 MB. If the metadata for the tenant is stored in splices (e.g., as represented in Table 2), the total size becomes about 80~90 MB. This increase in required storage size results from the languages-related information being duplicated several times (e.g., once per entity per tenant).

In view of the above context, implementations of the present disclosure provide an approach to storage of metadata in caches that reduces waste of cache memory, balances space and efficiency, and improves performance of cloud computing systems in terms of technical resources and latency. More particularly, the metadata storage of the present disclosure divides entities from multiple tenants into groups and, for each tenant and entity group, stores tenant-specific tenant metadata for the entities. The tenant metadata is retrieved from the cache in response to a request using a tenant identifier and group identifiers of respective entities, each group identifier indicating a group that a respective entity is grouped in.

FIG. 1 depicts an example architecture 100 in accordance with implementations of the present disclosure. In the depicted example, the example architecture 100 includes client devices 102, a network 106, and a server system 104. The server system 104 includes one or more server devices and databases 108 (e.g., processors, memory). In the depicted example, users 112 interact with the client devices 102. In the example of FIG. 1, a set of users 112 and respective client devices 102 can be associated with a first tenant 120 and a set of users 112 and respective client devices 102 can be associated with a second tenant 122.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes one or more servers 108. In the example of FIG. 1, the server system 104 is intended to represent various forms of servers including, but not limited to a web server, an application server, a proxy server, a network server, and/or a server pool. In general, server systems accept requests for services and provides such services to any number of client devices (e.g., the client device 102 over the network 106).

In some implementations, the server system 104 can embody a cloud computing environment, in which one or more of the servers 108 are application servers that receive requests, process the requests, and provide responses. For example, a server 108 can receive a request from the client device 102. In accordance with implementations of the present disclosure, and as described in further detail herein, metadata of each of multiple tenants is stored in a cache by groups based on entity. More particularly, byte arrays (serialized maps) are stored for each tenant and each group.

In further detail, metadata from multiple tenants is stored by group where each group has a respective group identifier (groupID). In some examples, the group identifiers (groupIDs) can be generated sequentially that as the next group is created, its groupID would be +1 larger than the previously created group. In some implementations, all entities that can be accessed by requests are divided into groups with each group containing, at most, N entities. Entities in a group are determined to have a close relationship either by their closeness across tenants. Entities may also have a close relationship with each other by having a fairly common request or set of requests from a tenant in which the response requires data from more than one entity. Alternatively, multiple different requests may be issued, but there is a statistical likelihood that a request for data from one entity is usually proximate to a second request for data from another entity (e.g., frequently visited in close proximity by individual requests). In some examples, a map is used to store the metadata of related entities in the same group. Here, the keys of the map are the entity names and the values of the map are the metadata of corresponding entities. The map is stored in the cache with the key (tenantID+groupID). Table 3 represents storage of metadata in a cache in accordance with implementations of the present disclosure:

TABLE 3

| Metadata Storage for Multiple Tenants (Store by Group) | |
|---|---|
| Cache Key (String, tenantID + groupID) | Cache Value (byte array) |
| | a map with a structure |
| tenant1, group1_1 | key (String, entity name) ... value (metadata of entity) |
| | entity1_1 ... metadata for tenant1's entity1 |
| | entity1_2 ... metadata tenant1's entity2 |
| | ... ... |
| | entity1_a ... metadata for tenant1's entity1_a |
| | a map with a structure |
| tenant1, group2_1 | key (String, entity name) ... value (metadata of entity) |
| | entity1_b ... metadata for tenant1's entity1_b |
| | ... ... |
| | entity1_g ... metadata for tenant1's entity1_g |
| | a map with a structure |
| tenant1, group3_1 | key (String, entity name) ... value (metadata of entity) |
| | entity1_h ... metadata for tenant1's entity1_h |
| | ... ... |
| | entity1_m ... metadata for tenant1's entity1_m |
| ... | ... |
| | a map with a structure |
| tenant2, group1_2 | key (String, entity name) ... value (metadata of entity) |
| | entity2_1 ... metadata for tenant2's entity2_1 |
| | entity2_2 ... metadata for tenant2's entity2_2 |
| | ... ... |
| | entity2_a ... metadata for tenant2's entity2_a |
| | a map with a structure |
| tenant2, group2_2 | key (String, entity name) ... value (metadata of entity) |
| | entity2_b ... metadata for tenant2's entity2_b |
| | ... ... |
| | entity2_ge ... metadata for tenant2's entity2_g |
| | a map with a structure |
| tenant2, group3_2 | key (String, entity name) ... value (metadata of entity) |
| | entity2_h ... metadata for tenant2's entity2_h |
| | ... ... |
| | entity2_m ... metadata for tenant2's entity2_m |
| ... | ... |
| | a map with a structure |
| tenant3, group1_3 | key (String, entity name) ... value (metadata of entity) |
| | entity3_1 ... metadata for tenant3's entity3_1 |
| | entity3_2 ... metadata for tenant3's entity3_2 |

TABLE 3-continued

| Metadata Storage for Multiple Tenants (Store by Group) | | |
| --- | --- | --- |
| Cache Key (String, tenantID + groupID) | Cache Value (byte array) | |
| . . . | . . . | |
| | entity3_a | metadata for tenant3's entity3_a |
| | a map with a structure | |
| tenant3, group2_3 | key (String, entity name) | value (metadata of entity) |
| | entity3_b | metadata for tenant3's entity3_b |
| | . . . | . . . |
| | entity3_g | metadata for tenant3's entity3_g |
| | a map with a structure | |
| tenant3, group3_3 | key (String, entity name) | value (metadata of entity) |
| | entity3_h | metadata for tenant3's entity3_h |
| | . . . | . . . |
| | entity3_m | metadata for tenant3's entity3_m for tenant3 |
| . . . | . . . | |

In Table 3, "group1_1F refers to "group 1 for tenant 1," "group1_2" refers to a different "group 1 that is for tenant 2,"and" group2_1" refers to "group 2 for tenant 1," etc. As such, multiple tenants' metadata storage in cache is as represented in Table 3. The value of number of entities in each group can be configured (e.g., determine an upper limit by performance testing to ensure acceptable CPU/memory consumption and latency including time to deserialize a map with a number of entities). In addition to the mapping shown in Table 3, a second mapping is generated that relates a (tenant id, entity name) pair to its corresponding groupID.

In some examples, a request can be received from a tenant and can implicate a multiple entities for the tenant that submitted the request (e.g., a request of the URL /rest/ User?$expand=address,profile). In response to the request, the group (or groups) that the entities (e.g., User, Address, Profile) are in are determined. The byte array(s) of the group(s) are read from the cache to local memory, the map(s) is/are deserialized from the byte array(s), and the metadata of each entity is provided from the map(s).

Compared with the metadata storage approach represented in Table 1, the metadata storage approach of the present disclosure is much more efficient in terms of consumption of technical resources and latency. For example, the metadata storage approach of the present disclosure only reads and deserializes the map with N entities, reducing time and consumption of technical resources relative to the metadata storage approach represented in Table 1. Compared with the metadata storage approach of Table 2, the metadata storage approach of the present disclosure has a smaller memory footprint within the cache. That is, the metadata storage approach of the present disclosure is more efficient in terms of memory consumption within the cache. For example, if a tenant has M entities, the languages-related information is duplicated M times in the cache for the approach represented in Table 2. However, in the metadata storage approach of the present disclosure, the languages-related information will be duplicated only P times or once for each group associated with that tenant where P is the number of groups of entities associated the tenant and where $M>P>1$. Similarly, a different tenant having R entities where the language-related information will be duplicated only Q times or once for each group associated with that different tenant where the different tenant will have Q groups associated with it and where $R>Q>1$. The one tenant will then have the P groups serialized into P byte arrays and the other tenant will have its Q groups serialized into Q byte arrays. In this manner, memory of the cache is conserved.

Figure 2:
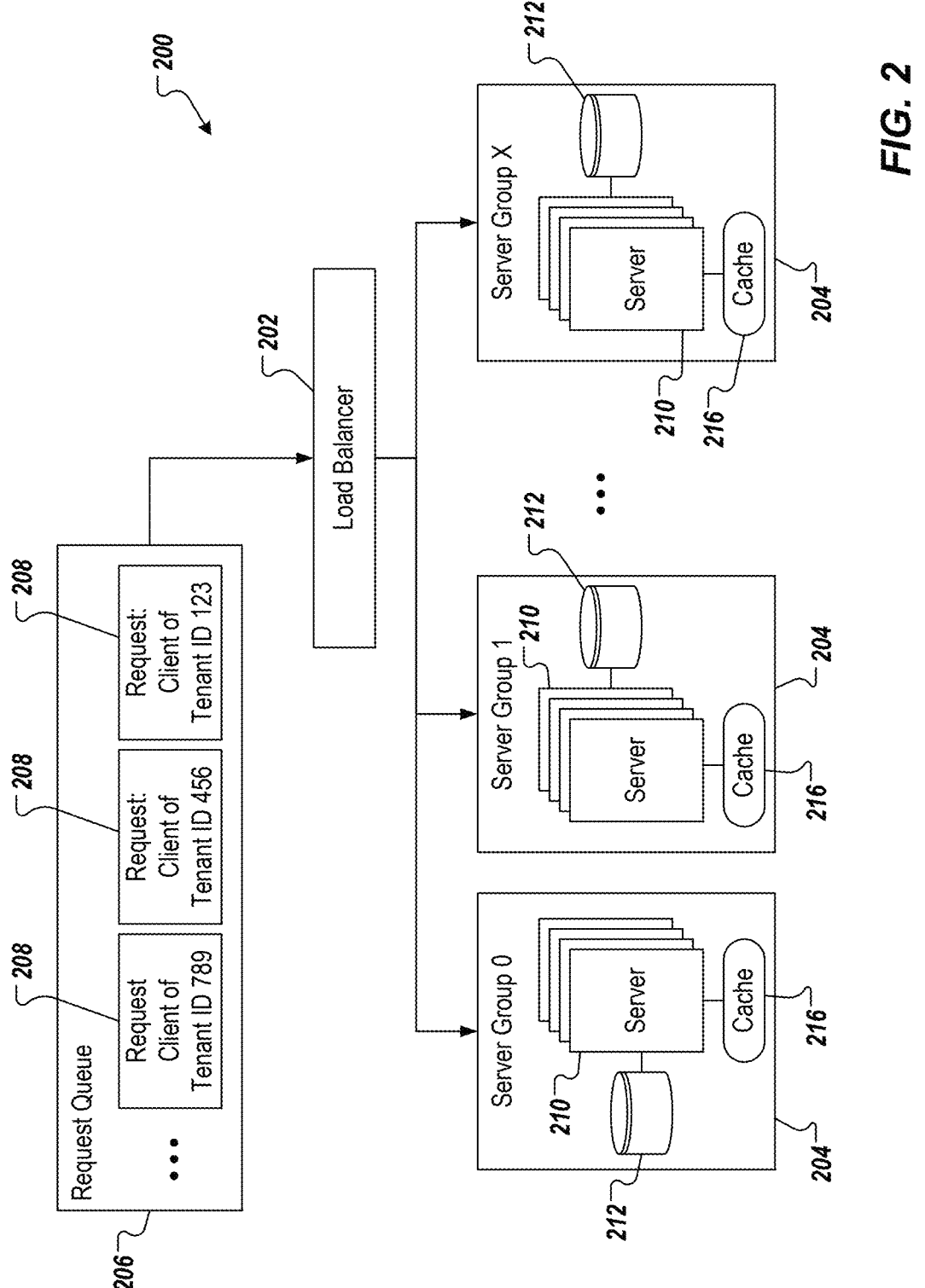
FIG. 2 depicts an example request handling architecture in accordance with implementations of the present disclosure.

FIG. 2 depicts an example request handling architecture 200 in accordance with implementations of the present disclosure. In some examples, the request handling architecture 200 of FIG. 2 is provided by the server system 104 of FIG. 1. In the example of FIG. 2, the request handling architecture 200 is depicted and includes a load balancer 202, server groups 204, and a request queue 206. The request queue 206 includes requests 208 issued from two or more tenants, which are to be routed to application servers 210 of respective server groups 204. Each request 208 includes an identifier that uniquely identifies a tenant. Each server group 20r includes a permanent data store 212 (e.g., disk store) that stores tenant data (e.g., for each tenant, employee profiles, customer profiles, purchase orders, etc.). It should be noted that other components such as additional internal networks, failover management etc. are omitted for clarity.

The example of FIG. 2 represents distribution of the requests to server groups 204. An example of this is disclosed in commonly assigned U.S. application Ser. No. 18/332,860, filed Jun. 12, 2023, the disclosure of which is expressly incorporated herein by reference for all purposes. It is contemplated, however, that implementations of the present disclosure can be realized in any appropriate approach for distributing requests to servers for handling.

In some examples, each server 210 includes a cache 216 that stores tenant metadata for each of the tenants that submit requests. In some examples, each server group 204 includes a cache cluster that stores tenant metadata for each of the tenants that submit requests. For example, each server 210 in a server group 204 uses a remote portal (all servers 210 use the same remote portal) to access the cache cluster. Each server 210 reads a binary byte array of entities from the cache 216 (or cache cluster), deserializes it, and stores it in local memory of the server 210. Each cache 216 (or cache cluster) stores byte arrays that are indexed by tenantID and groupID. Each request 208 is routed (e.g., by the load balancer 202) to a server 210 for handling. In some examples, some requests 208 may implicate one or more entities (e.g., data objects) that are to be accessed in handling the request. In receiving a request 208, the server 210 determines a set of entities (e.g., one or more entities that are implicated by the request) from the request associated with a particular tenant. For example, the request 208 can specifically identify one or more entities directly (e.g., the entity is specifically listed in the request) and one or more entities indirectly (e.g., the called entity references other entities) that can be identified from navigations from specifically identified entities. The server 210 retrieves one or more byte arrays from the cache. For example, for each entity in the set of entities determined to be needed to respond to the request, the server 210 determines the group that the entity or entities has or have been grouped to. In some examples, an entity-group map can be provided that indicates the group that each entity associated with each tenant is assigned to. The server 210 retrieves byte arrays for the tenant for each group by accessing the cache 216 using [tenantID, groupID] as keys. For each [tenantID, groupID], the server 210 retrieves a byte array from the cache 216 and stores the byte array in local memory of the respective server 210. The server 210 deserializes the byte array (e.g., using a language-specific deserializer) to recover the map that had been encoded in the byte array, the map including the tenant-specific metadata for each entity that is in the respective group. In this manner, the server 210 can use the tenant-specific metadata of respective entities for handling the request wherein the amount of data necessary in a cache 216 is reduced and yet still operational with respect to operations of the metadata map. This approach has advantages in that it can reduce the need to swap data in the cache 216 in order to get the necessary parts of the metadata map into cache 216 and then the correct entity related data into local memory of server 210.

Implementations of the present disclosure further provide an approach for grouping of entities into groups. In some implementations, grouping includes dividing entities into initial groups by navigation definitions, dividing initial groups that are determined to be large (e.g., groups having greater than N entities) into smaller initial groups (e.g., groups having less than or equal to N entities), and transforming the initial groups into (final) groups for storage of metadata in a cache. Grouping of entities into groups is discussed in further detail with reference to FIGS. 3A-3G.

With regard to dividing entities into initial groups by navigation definitions, one or more entities can have navigation to other entities. For example, and with non-limiting reference to the example of Listing 1, the entity User has navigation to the entity Photo and the entity Address, and the entity Photo and/or the Address can have navigation to other entities. In some examples, all of the entities are divided into initial groups by navigation definitions, and an undirected unweighted graph is generated. The vertexes (nodes) of the undirected unweighted graph are each representative of an entity. The edges of the undirected unweighted graph are the navigation relationships among entities. In some examples, the undirected unweighted graph is divided into multiple connecting components using depth-first search (DFS) or breadth-first search (BFS). In general, BFS and DFS each divide the undirected unweighted graph into multiple subgraphs, where each sub-graph represents a connecting component. In this manner, every connecting component is one initial group, and the entities in the same connecting component are in the same initial group.

Figure 3A:
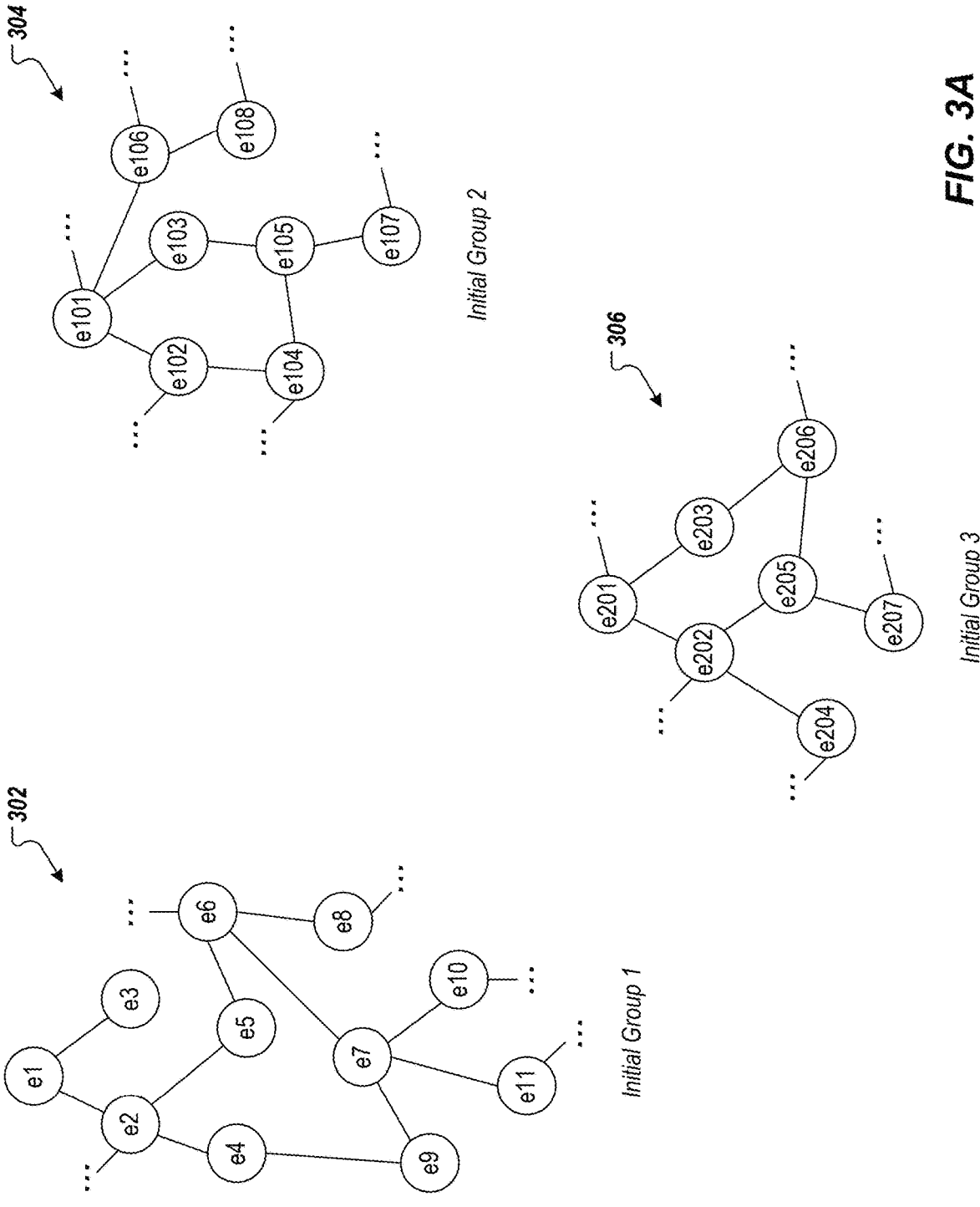
FIGS. 3A-3G collectively depict an example of grouping entities in accordance with implementations of the present disclosure.

For example, and with non-limiting reference to FIG. 3A, one or more undirected unweighted graphs are constructed and represent all entities and navigation relationships between those entities. Once the initial undirected unweighted graph or graphs are constructed, and as shown in the example of FIG. 3A, the undirected unweighted graph or graphs are divided into the initial groups 302, 304, 306 (initial groups can be described as connected components) and each of the initial groups 302, 304, 306 contain one or more entities.

A determination is then made regarding the sizes of the initial groups. For large groups (e.g., groups having greater than N entities), those groups are selected and divided into smaller initial groups (e.g., groups having less than or equal to N entities). This dividing larger initial groups into smaller initial groups can be done by first determining query counts between pairs of entities (e.g., entities having navigation therebetween). In some examples, access logs of web services that query the relationships among different entities are retrieved for a time period (e.g., multiple months). The query count of the relationship between two entities is calculated from the access logs. Here, the access logs record, for each request, entities that are implicated by the request and navigations between entities. By way of non-limiting example, the access log can indicate a log to query /odata/v2/entity1?$expand=entity2Nav/entity4Nav, entity2Nav/ entity5Nav, entity3Nav, and as such, the calculation of query count is as represented in Table 4:

TABLE 4

| Calculate Query Counts of Relationship between Entity Pairs | |
| --- | --- |
| Relationship | Calculation of query count |
| entity1-entity2 | increase by 1 |
| entity1-entity3 | increase by 1 |
| entity2-entity4 | increase by 1 |
| entity2-entity5 | increase by 1 |

In the example of the example access log as represented in Table 4, the navigation entity2Nav corresponds to entity2, entity3Nav corresponds to entity3, entity4Nav corresponds to entity4, and entity5Nav corresponds to entity5. There are 4 pairs of entity bindings, namely (entity1, entity2), (entity2, entity4), (entity2, entity5), (entity1, entity3).

Figure 3B:
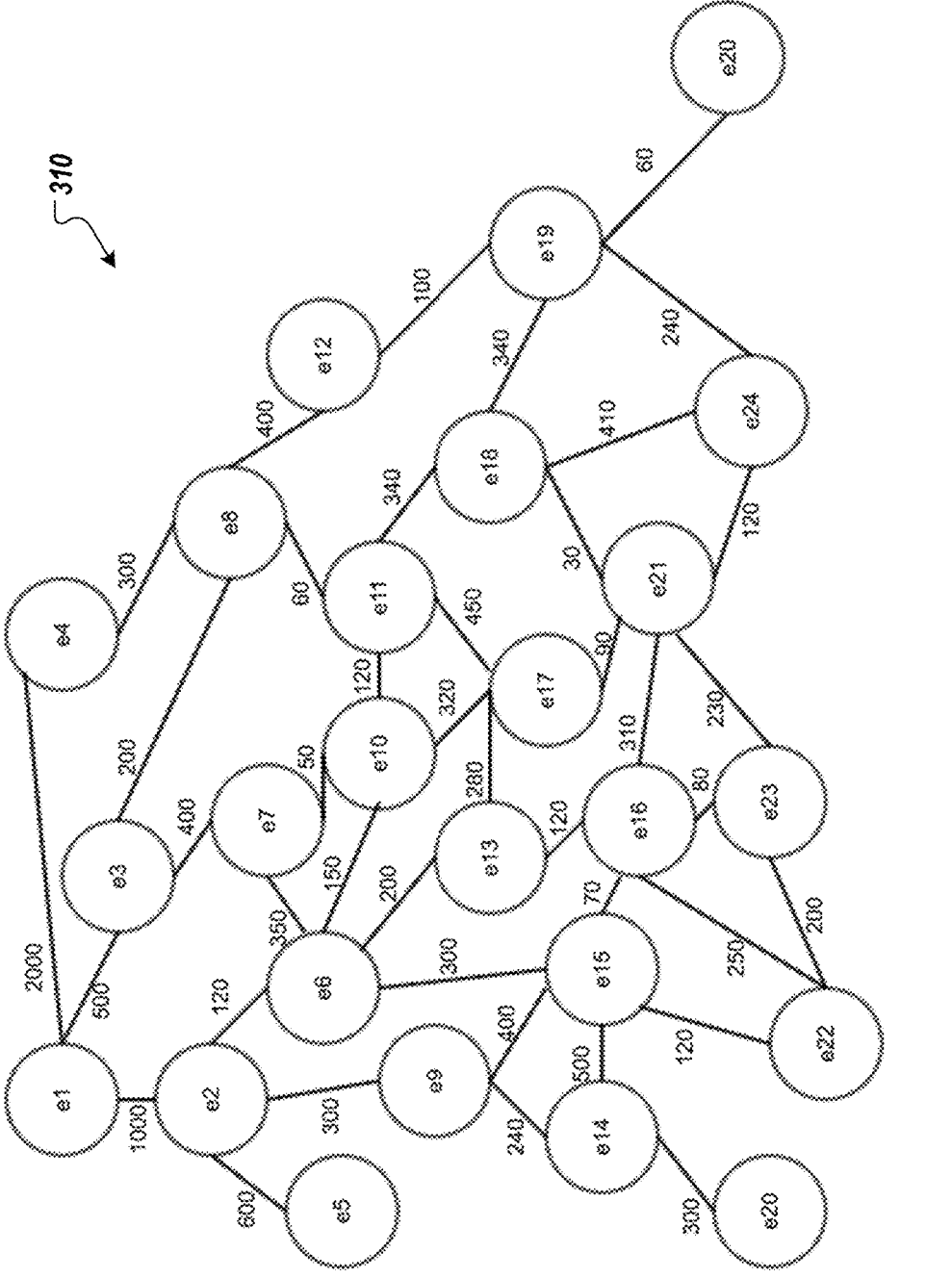

In some implementations, for each initial group having a number of entities that exceeds N, an undirected weighted graph is then created. The vertexes of the undirected weighted graph are the entities in that initial group and the weights of the edges of the undirected weighted graph are the query counts (determined from access logs) of the relationships between pairs of entities in the initial group. FIG. 3B depicts an example of an undirected weighted graph 310 in accordance with implementations of the present disclosure. In the examples of FIG. 3B, the weights (query counts) between entities are determined from access logs. For example, for the entity e1 and the entity e4, the access logs indicate that processing of requests (e.g., over a time period represented in the access logs) resulted in navigation between the entity e1 and the entity e4 2000 times. As another example, for the entity e1 and the entity e2, the access logs indicate that processing of requests (e.g., over the time period represented in the access logs) resulted in navigation between the entity e1 and the entity e2 1000 times.

Figure 3C:
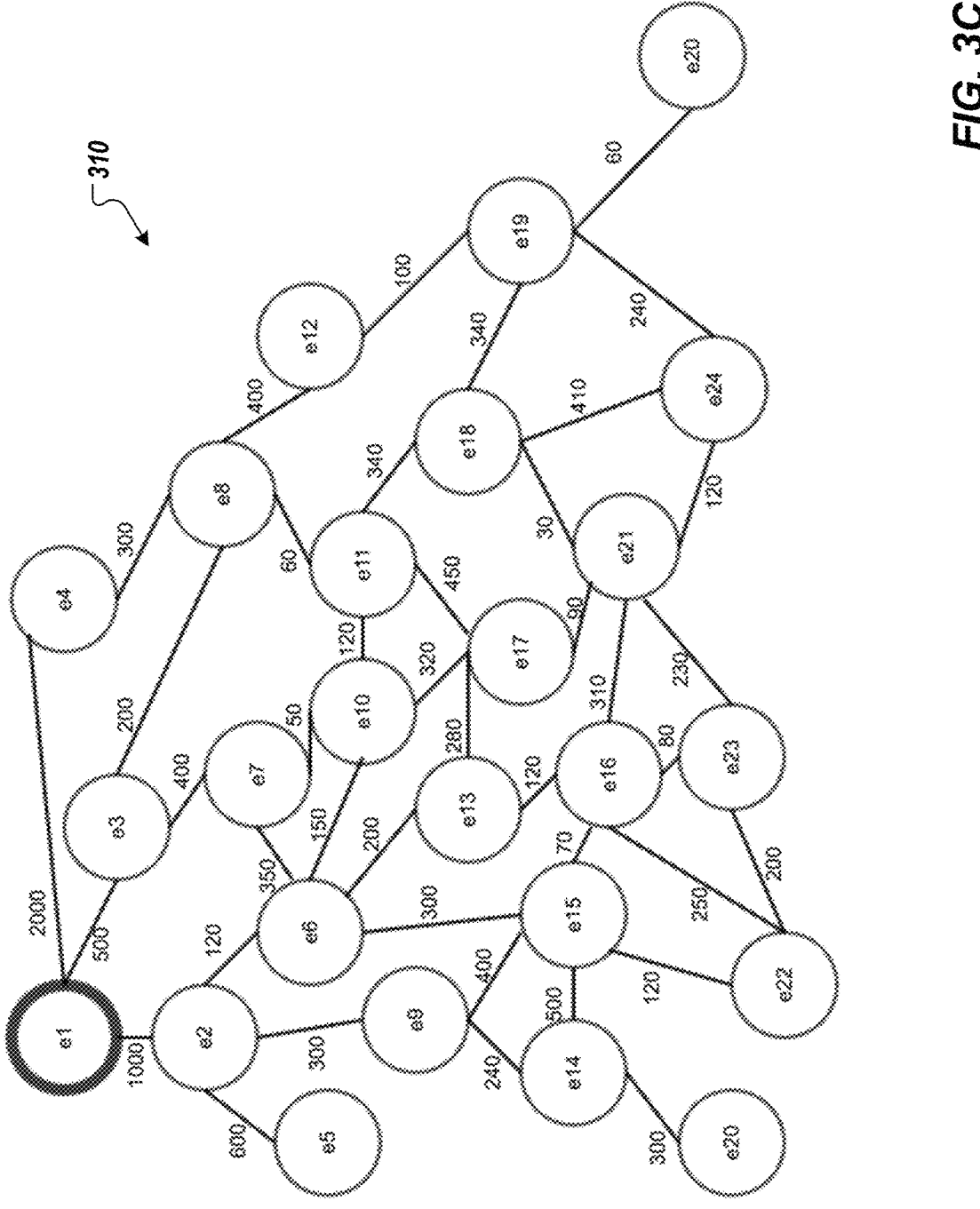
Figure 3D:
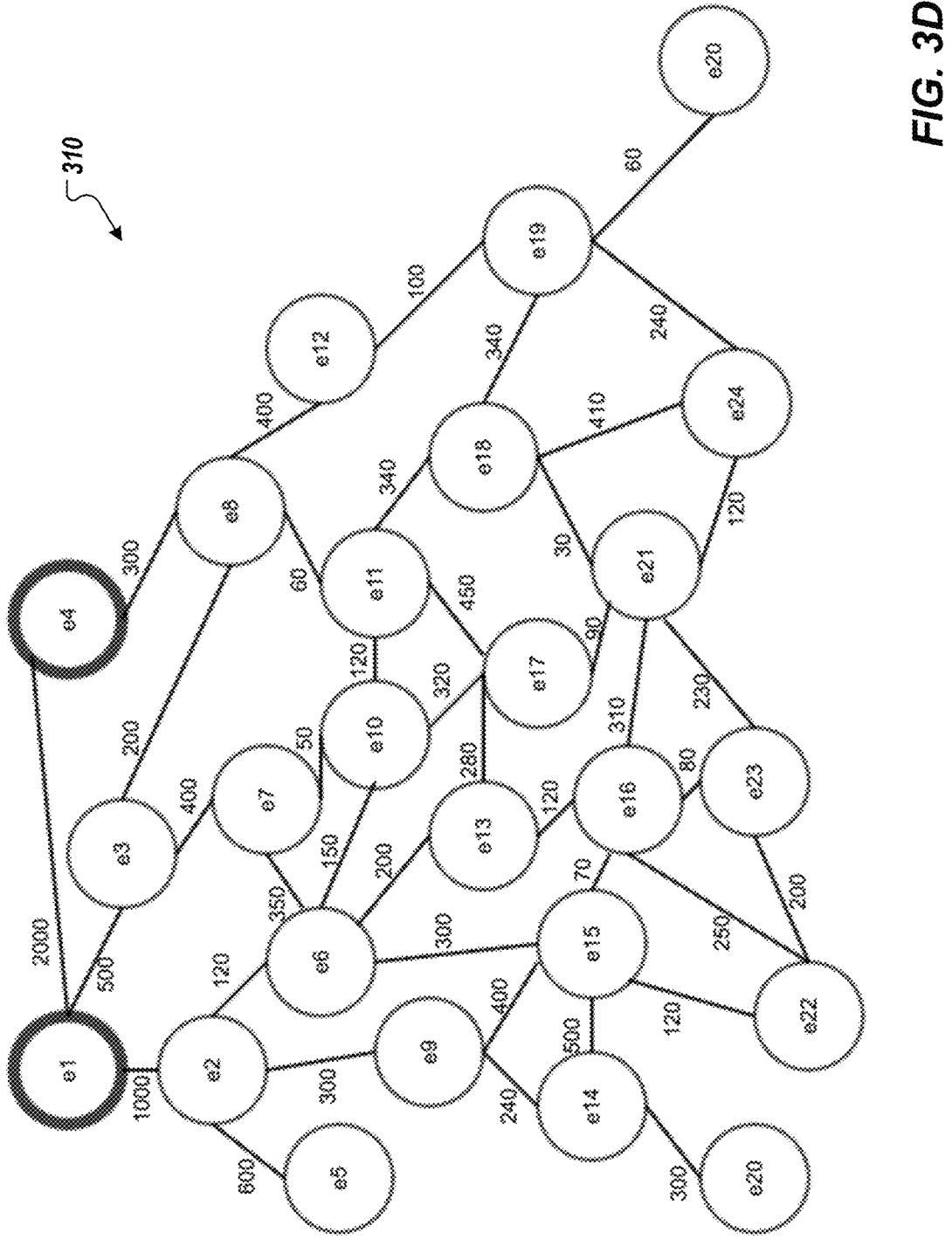

In some implementations, the entity that has the maximum total weight of linked edges to it within the undirected weighted graph is selected and a new initial group is created for the entity that is selected. For example, and with non-limiting reference to FIG. 3C, an entity e1 is selected, which has the maximum total weight of linked edges (e.g., 2000+1000+500=3500) among all other entities represented in the undirected weighted graph. Accordingly, a new initial group is created for the entity e1. In FIG. 3C, creation of the new initial group for the entity e1 is indicated with bold outline of the entity e1. Accordingly, a new initial group is created and, at the outset, only includes the entity e1, in this example. In some implementations, if two or more entities have the same maximum total weight, tiebreaker mechanisms can be used such as selecting the entity with the greatest number of edges, the entity with the single greatest weighted edge linked to it, etc.

Figure 3E:
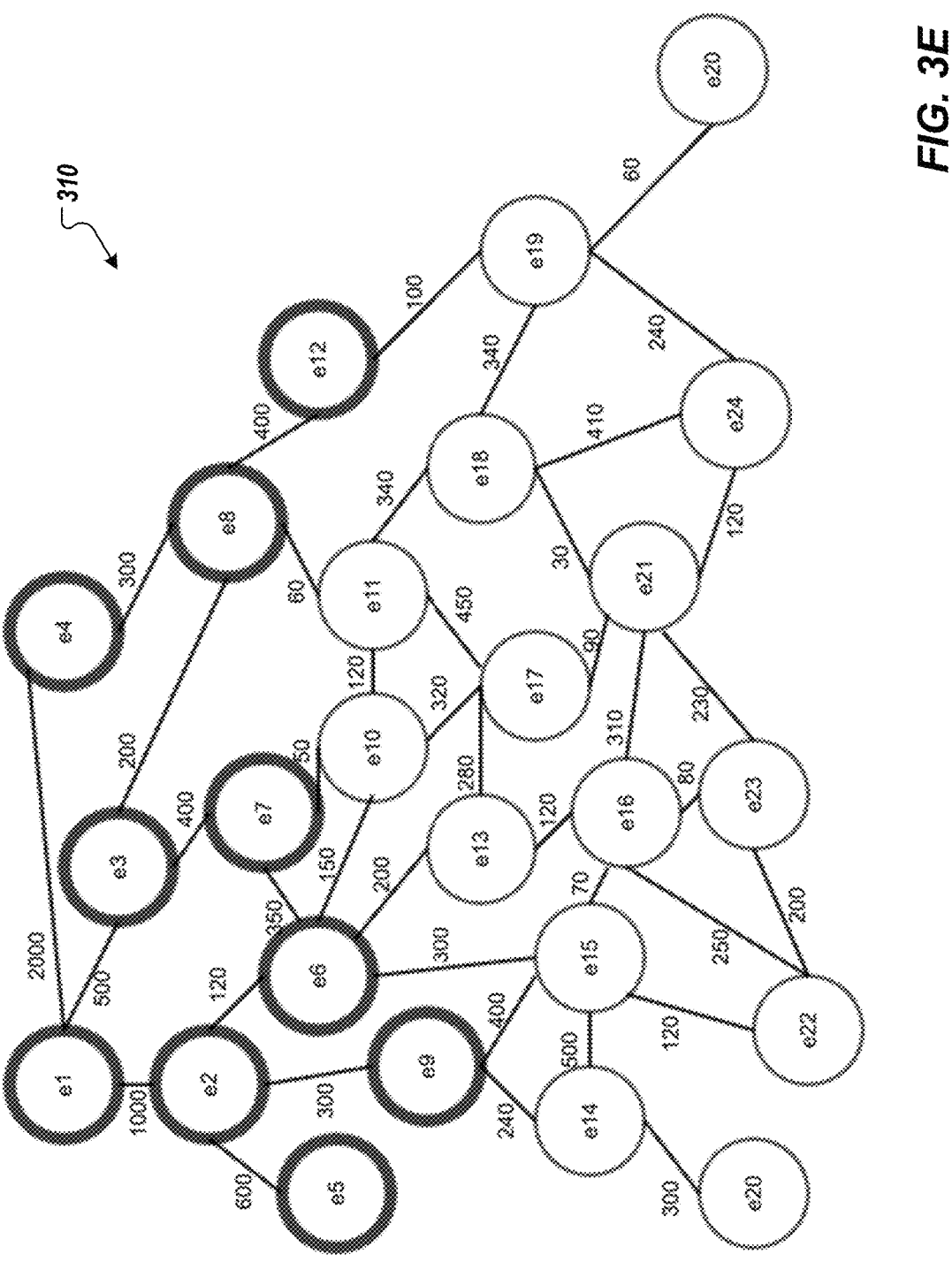

In some implementations, other entities of the undirected weighted graph can be added to the new initial group. In some examples, an entity that has the maximum weight of edges linked to any entity in the new group is selected. For example, in FIG. 3D, the entity e4 is selected, which has the maximum weight of edges linked to entities in the new group (2000). Consequently, the entity e4 is added to the new group (as indicated with bold outline). This is repeated until there are N entities in the new initial group. For example, FIG. 3E depicts the addition of entities to the new initial group (as indicated by bold outlines) until N entities populate the new initial group, where N=10.

Figure 3F:
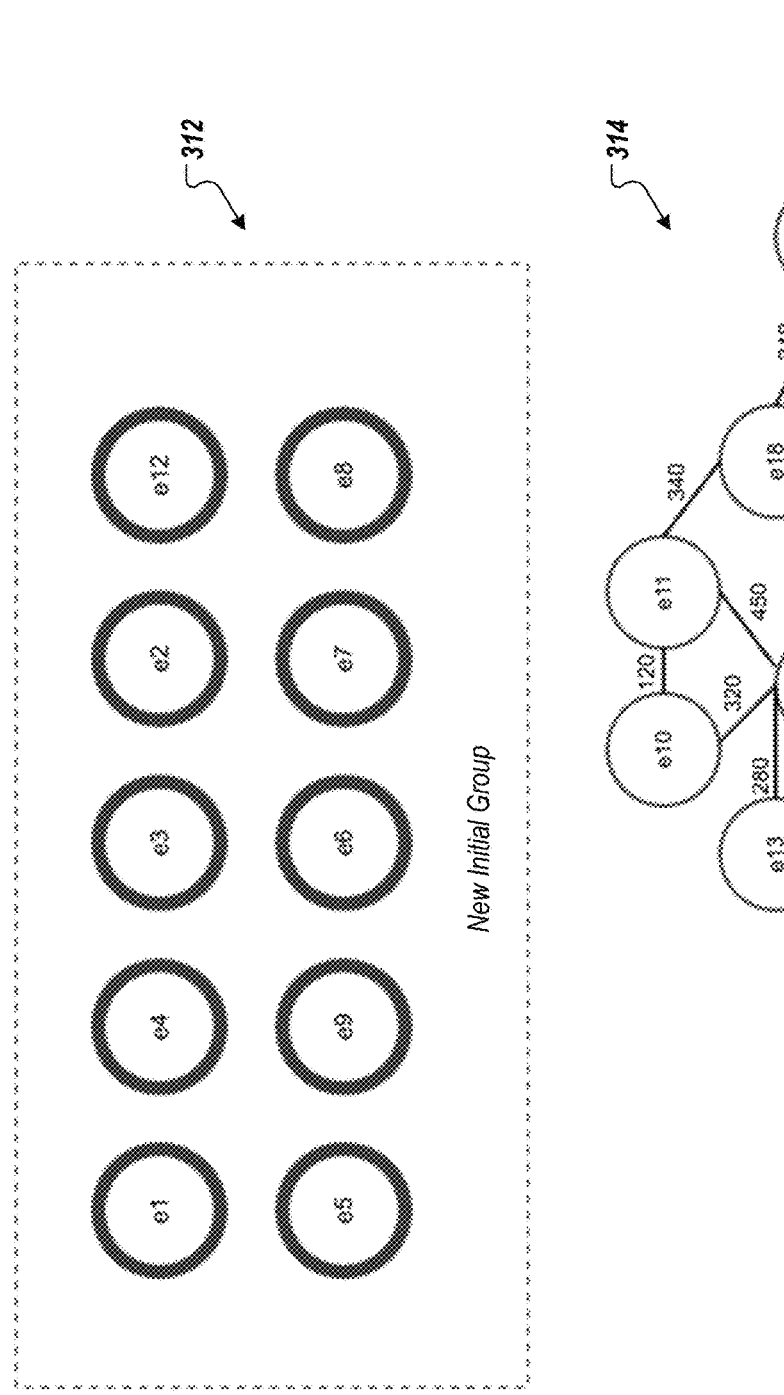
Figure 3F:
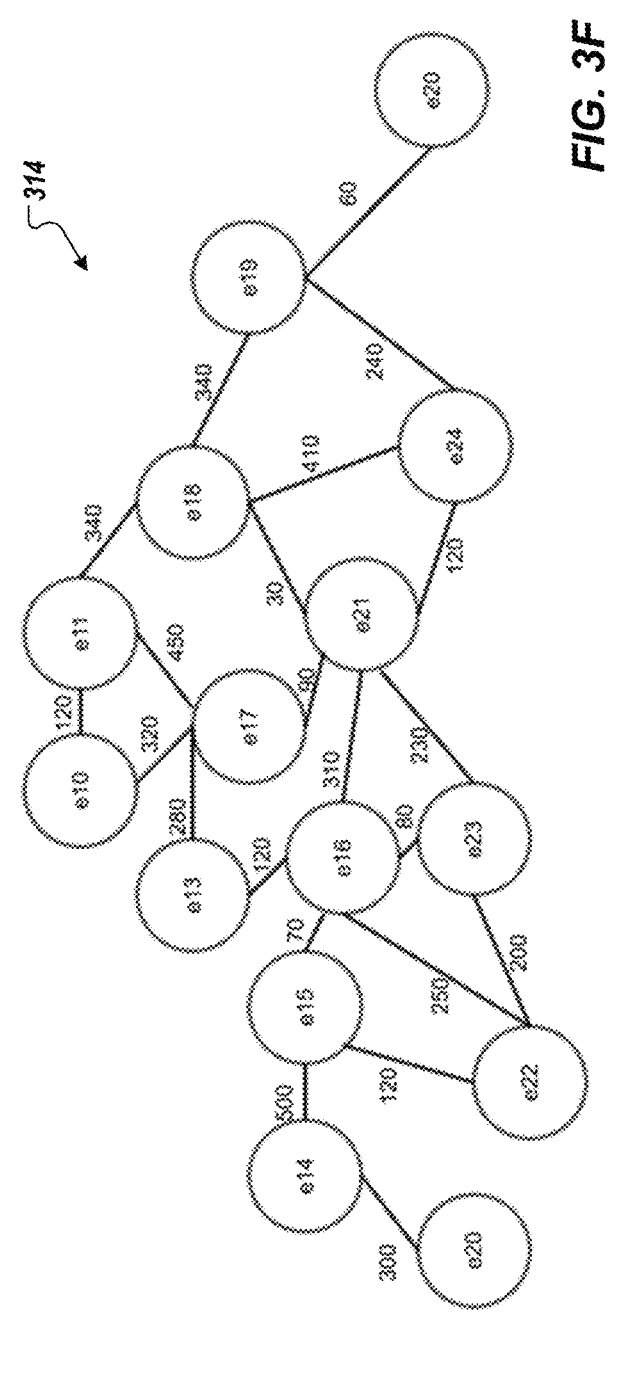

After the new initial group is populated with N entities, the entities of the new initial group and edges are removed from the undirected weighted graph. For example, and as depicted in FIG. 3F, the entities of a new initial group 312 are removed from the undirected weighted graph 310 to provide an updated undirected weighted graph 314. In the example of FIG. 3F, the updated undirected weighted graph 314 includes greater than N entities. Consequently, the process is repeated and another new initial group is created until only N or less than N entities remain. It should be noted that in some circumstances, not every relationship or navigation between each entity is necessarily preserved. As an example, the edge between e8 and e11 shown in FIG. 3E is not preserved in the graph shown in FIG. 3F as a result of forming the groups (i.e., e8 and e11 will be assigned to two different groups).

With regard to transforming the initial groups into groups for storage of metadata in a cache, initial groups can be selectively merged. For example, if an initial group has an entity count that is equal to N, the initial group is treated as a group for storage of metadata in a cache. If an initial group has an entity count of less than N, entity counts of other initial groups are determined to find one or more other initial groups to merge with the initial group, while ensuring that the combined entity count is less than or equal to N. If one or more other groups are found, they are merged with the initial entity group as a group for storage of metadata in a cache. If not found, the initial group is treated as a group for storage of metadata in a cache, even though its entity count is less than N.

Figure 3G:
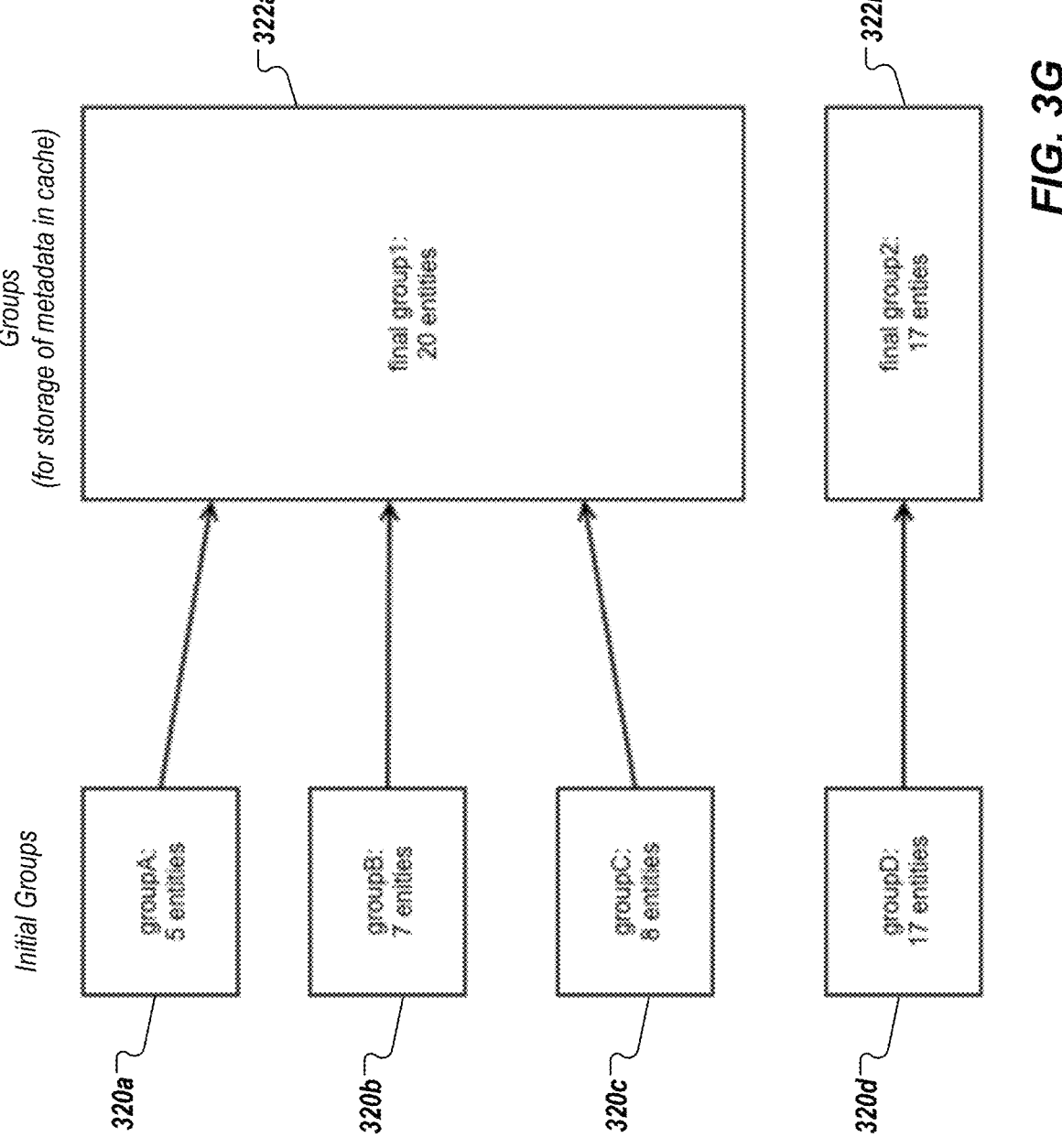

To illustrate, the example of FIG. 3G can be considered, which includes initial groups 320a, 320b, 320c, 320d. In this example, N is equal to 20. As such, the initial groups 320a, 320b, 320c can be merged to provide a group 322a. In the example of FIG. 3G, it is determined that the initial group 320d cannot be merged with another initial group. Consequently, the initial group 320d is treated as a group 322b. Here, the groups 322a, 322b are used for storage of metadata in a cache, as described herein.

For each group to be used for storage of metadata in a cache (e.g., groups 322a, 322b of FIG. 3G), the metadata of entities of that group are stored in a map, the map is serialized (using a language-specific serializer) into a byte array, and the byte array is stored in the cache with the key (tenantID+groupID). This is represented in Table 3, as described herein.

Figure 4:
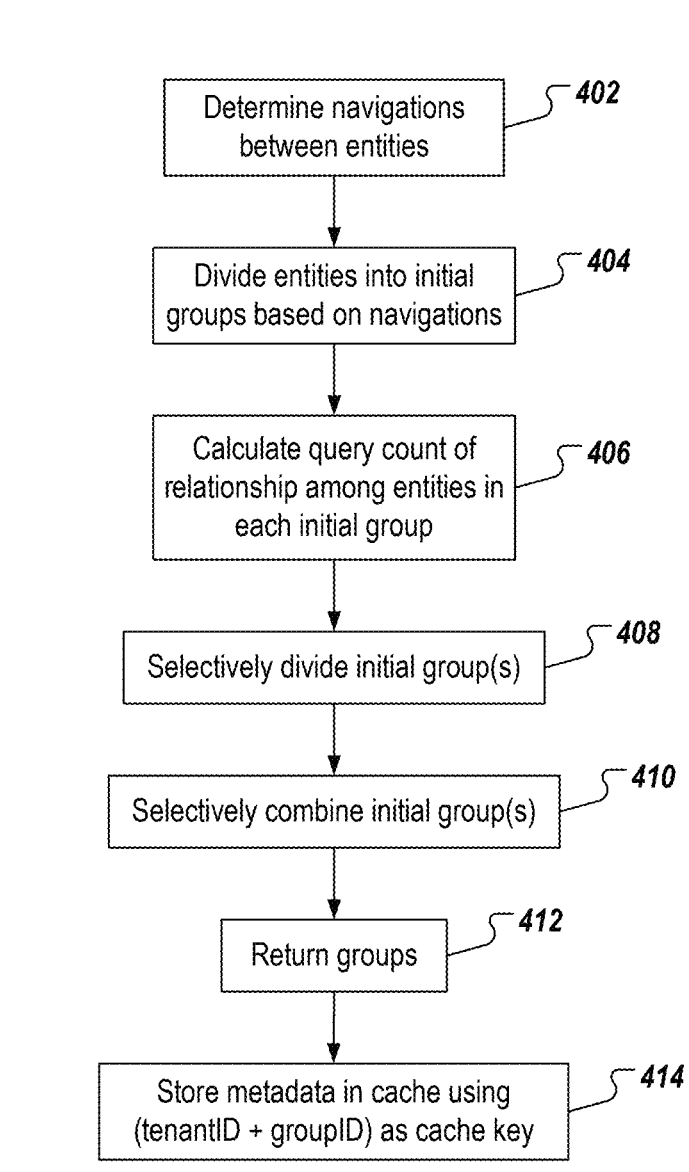
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. In some examples, the example process 400 is executed to group entities, as described in detail herein.

Navigations between entities are determined (402). For example, and as described herein, a set of entities is provided and represents all possible entities that multiple tenants can access in interacting with an application in a cloud computing environment. Pairs of entities can have navigations therebetween (e.g., accessing a first entity can result in accessing a second entity, one entity can inherit or interface with another entity or one entity may be statistically requested proximate to another entity, etc.). Navigations, or other associations, between entities can be determined (e.g., from entity definitions), and an undirected, unweighted graph can be determined. Entities are divided into initial groups based on navigations (404). For example, and as described herein, the undirected unweighted graph is divided into multiple connecting components using DFS or BFS, where every connecting component is one initial group, and the entities in the same connecting component are in the same initial group (see, e.g., FIG. 3A).

Query counts of relationships between entities in each initial group are calculated (406). For example, and as described herein, access logs that represent access to the entities over a time period (e.g., several months) are used to determine query counts between entities in the undirected, unweighted graphs of the initial groups. The query counts are added to edges to provide an undirected, weighted graph for each of the initial groups (see, e.g., FIG. 3B). One or more initial groups are selectively divided (408). For example, and as described herein, if an initial group has an entity count that exceeds N, the initial group is divided into smaller initial groups (see, e.g., FIGS. 3C-3F and related discussion herein). Other initial groups that have fewer than N entities are selectively combined (410). For example, and as described herein, if the entity counts of multiple initial groups are each less than N, these initial groups can be combined (see, e.g., FIG. 3G and related discussion) into larger initial groups where the entity counts within each combined groups approaches N. Groups are provided (412) and metadata for each tenant is stored in the cache (414). For example, and as described herein, for each tenant and each group, a map is provided that maps tenant metadata of the tenant to entities of the group, the maps are serialized to byte arrays, and the byte arrays are stored in the cache with indexes of [tenantID, groupID]. That is, each [tenantID, groupID]pair indexes a respective byte array in the cache.

Figure 5:
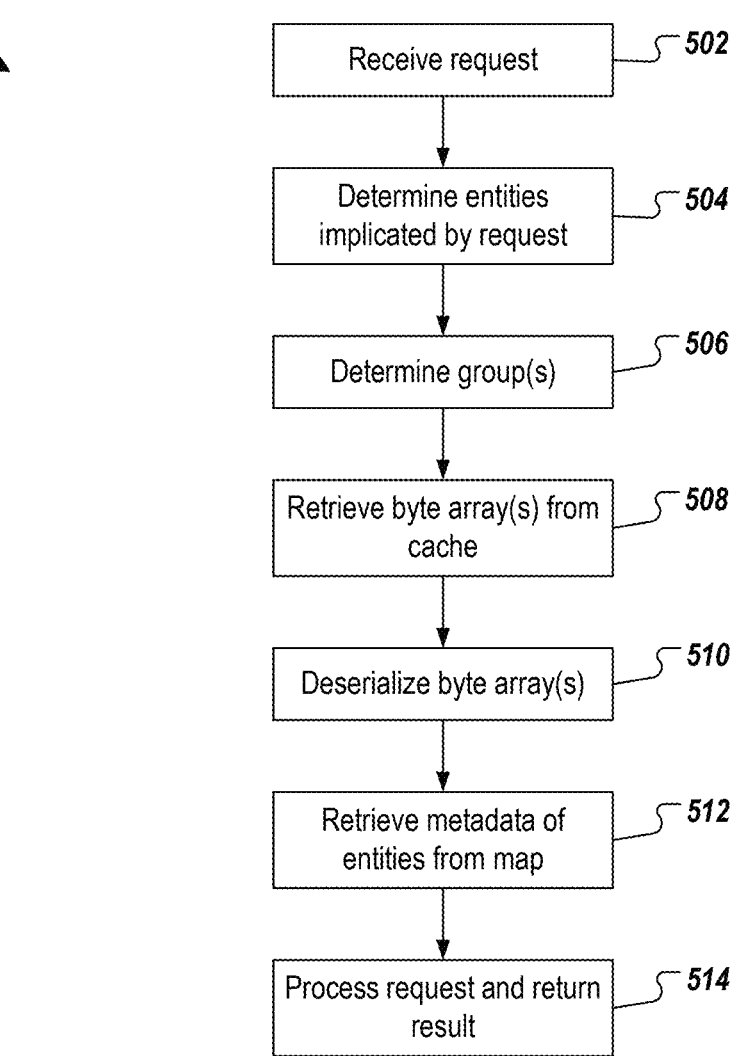
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices. In some examples, the example process 500 is executed to retrieve metadata from the cache in response to a request.

A request is received (502). For example, and as described herein, tenants can submit requests to applications in cloud computing systems. With reference to FIG. 2, tenants can submit request 208 that are queued in a request queue 206 for routing to application servers 210, which process the requests 208. A set of entities implicated by the request is determined (504). For example, and as described herein, an application server 210 can receive a request 208 and determine entities that are implicated by the request (e.g., by entity name) and this can be done directly (e.g., one entity specifically navigates to a second entity) or indirectly (e.g., a first entity navigates to a third entity through a second entity). A group identifier for each entity is determined (506). For example, and as described herein, each entity can be mapped to a group that the entity has been grouped to, each group having a groupID.

For each group, a byte array is retrieved from the cache (508). For example, and as described herein, a byte array is retrieved from the cache 216 using a key [tenantID, groupID], where the tenantID indicates the tenant that the request 208 was received from and the groupID indicates the group that the entity is grouped into. Each byte array is deserialized to provide a respective map (510). For example, and as described herein, each byte array can be stored in local memory (e.g., of the applications server 210) and a deserializer (language-specific) can be used to deserialize the byte array to a map that is encoded in the byte array. Metadata of each entity is retrieved from the map (512). For example, and as described herein, the map maps tenant metadata of the tenant to entities in the group. The request is processed and a result is returned (514). For example, and as described herein, the application server 210 processes the request using the tenant metadata, which includes tenant-specific properties and logic that is used in processing entities.

Figure 6:
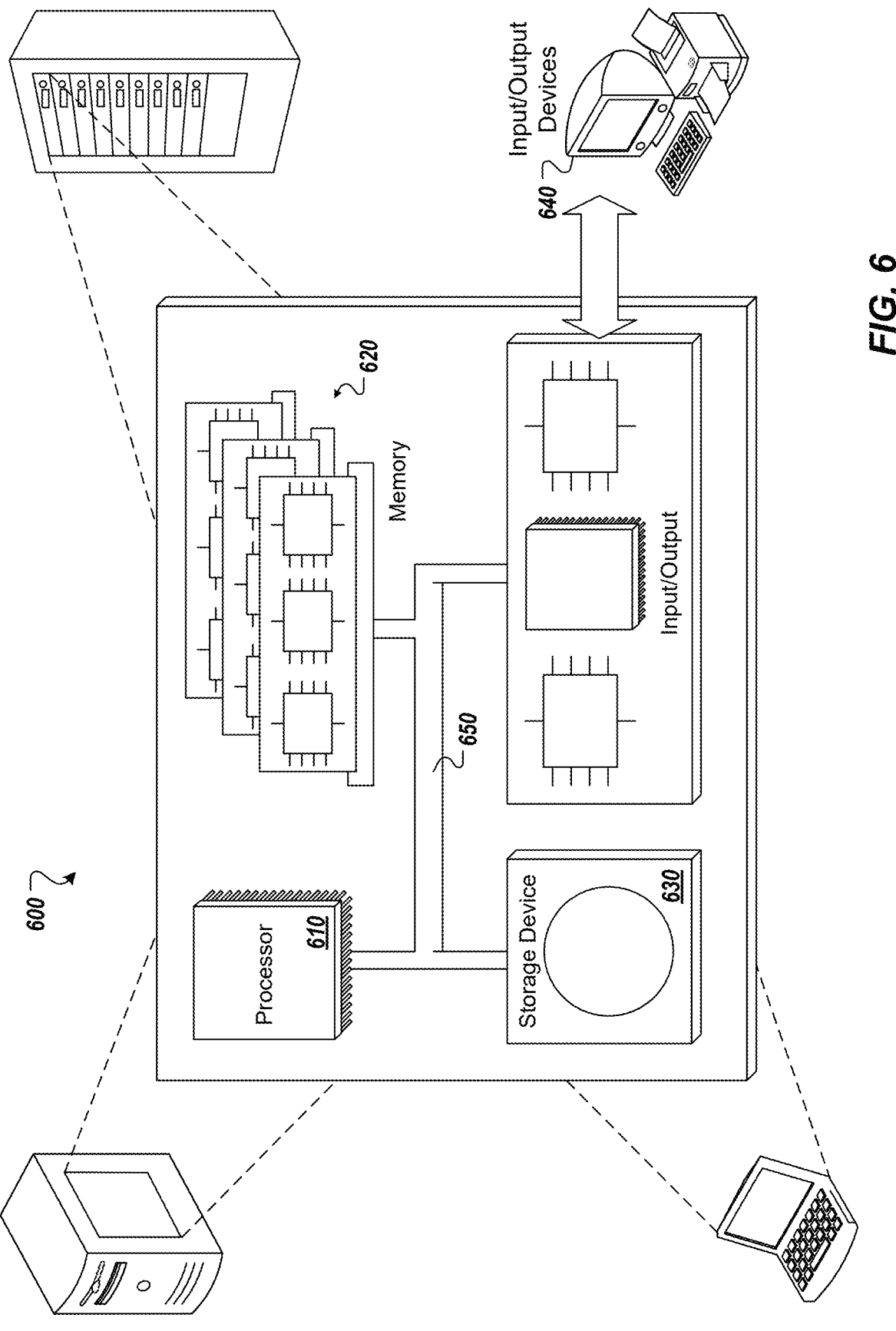
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations thereof. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for storage and retrieval of metadata representative of entities in caches of cloud computing environments, the method being executed by one or more processors and comprising:

storing, within a cache, a set of P byte arrays where a first byte array in the set of P byte arrays is a representation of a map associated with a first plurality of entities where the first plurality of entities are associated with a first tenant and the first tenant is associated with M entities, where M>P>1 and the set of P byte arrays are indexed by tenant identifier and group identifier pairs, storing within the cache comprising:

receiving the M entities, dividing the M entities into a set of initial groups so that each initial group comprises a sub-set of M entities, splitting at least one initial group into multiple initial groups using an undirected, weighted graph comprising vertices representing the M entities and edges representing relationships between the M entities, each edge having a weight determined by the relationship between two of the M entities, and storing a map that associates each of the M entities with one of the initial groups;

receiving a first request from the first tenant, the first request being associated with a first entity in the first plurality of entities;

for the first entity in the first plurality of entities, retrieving, from the cache, the first byte array by indexing at least a first subset of the P byte arrays using a tenant identifier of the first tenant and a first group identifier from a set of first group identifiers wherein the first group identifier is associated with the first entity;

generating a first map from the first byte array, the first map comprising first metadata that defines properties and logic associated with the first entity; and processing at least a portion of the first request using the first metadata.

2. The computer-implemented method of claim 1, wherein the first entity has an association to a second entity and wherein the second entity is part of the first plurality of entities wherein the first map further comprises second metadata that defines properties and logic associated with the second entity and the processing at least a portion of the first request uses the second metadata.

3. The computer-implemented method of claim 1, wherein the first request is further associated with a second entity in a second plurality of entities further comprising:

for the second entity in the second plurality of entities, retrieving, from the cache, a second byte array by indexing at least a second subset of the P byte arrays using the tenant identifier and a second group identifier from the set of first group identifiers wherein the second group identifier is associated with the second entity;

generating a second map from the second byte array, the second map comprising second metadata that defines properties and logic associated with the second entity; and processing the at least a portion of the first request further using the second metadata.

4. The computer-implemented method of claim 2, wherein the first entity is associated with a second entity in a second plurality of entities, the method further comprising:

for the second entity in the second plurality of entities, retrieving, from the cache, a second byte array by indexing at least a second subset of the P byte arrays using the tenant identifier and a second group identifier from the set of first group identifiers wherein the second group identifier is associated with the second entity;

generating a second map from the second byte array, the second map comprising second metadata that defines properties and logic associated with the second entity; and processing the at least a portion of the first request further using the second metadata.

5. The computer-implemented method of claim 1, further comprising merging at least two the initial groups into a single initial group.

6. The computer-implemented method of claim 1, wherein splitting the at least one initial group is executed in response to determining that the at least one initial group includes a number of entities that exceeds a threshold number of entities.

7. The computer-implemented method of claim 1, where the relationship between two of the M entities is determined from access logs.

8. A non-transitory computer-readable storage medium coupled to one or more processors and having instructions stored thereon which, when executed by the one or more processors, cause the one or more processors to perform operations for storage and retrieval of metadata representative of entities in caches of cloud computing environments, the operations comprising:

storing, within a cache, a set of P byte arrays where a first byte array in the set of P byte arrays is a representation of a map associated with a first plurality of entities where the first plurality of entities are associated with a first tenant and the first tenant is associated with M entities, where M>P>1 and the set of P byte arrays are indexed by tenant identifier and group identifier pairs, storing within the cache comprising:

receiving the M entities, dividing the M entities into a set of initial groups so that each initial group comprises a sub-set of M entities, splitting at least one initial group into multiple initial groups using an undirected, weighted graph comprising vertices representing the M entities and edges representing relationships between the M entities, each edge having a weight determined by the relationship between two of the M entities, and storing a map that associates each of the M entities with one of the initial groups;

receiving a first request from the first tenant, the first request being associated with a first entity in the first plurality of entities;

for the first entity in the first plurality of entities, retrieving, from the cache, the first byte array by indexing at least a first subset of the P byte arrays using a tenant identifier of the first tenant and a first group identifier from a set of first group identifiers wherein the first group identifier is associated with the first entity;

generating a first map from the first byte array, the first map comprising first metadata that defines properties and logic associated with the first entity; and processing at least a portion of the first request using the first metadata.

9. The non-transitory computer-readable storage medium of claim 8, wherein the first entity has an association to a second entity and wherein the second entity is part of the first plurality of entities wherein the first map further comprises second metadata that defines properties and logic associated with the second entity and the processing at least a portion of the first request uses the second metadata.

10. The non-transitory computer-readable storage medium of claim 8, wherein the first request is further associated with a second entity in a second plurality of entities further comprising:

for the second entity in the second plurality of entities, retrieving, from the cache, a second byte array by indexing at least a second subset of the P byte arrays using the tenant identifier and a second group identifier from the set of first group identifiers wherein the second group identifier is associated with the second entity;

generating a second map from the second byte array, the second map comprising second metadata that defines properties and logic associated with the second entity;

and processing the at least a portion of the first request further using the second metadata.

11. The non-transitory computer-readable storage medium of claim 9, wherein the first entity is associated with a second entity in a second plurality of entities, the method further comprising:

for the second entity in the second plurality of entities, retrieving, from the cache, a second byte array by indexing at least a second subset of the P byte arrays using the tenant identifier and a second group identifier from the set of first group identifiers wherein the second group identifier is associated with the second entity;

generating a second map from the second byte array, the second map comprising second metadata that defines properties and logic associated with the second entity; and processing the at least a portion of the first request further using the second metadata.

12. The non-transitory computer-readable storage medium of claim 8, wherein operations further comprise merging at least two the initial groups into a single initial group.

13. A system, comprising:

a computing device; and a computer-readable storage device coupled to the computing device and having instructions stored thereon which, when executed by the computing device, cause the computing device to perform operations for storage and retrieval of metadata representative of entities in caches of cloud computing environments, the operations comprising:

storing, within a cache, a set of P byte arrays where a first byte array in the set of P byte arrays is a representation of a map associated with a first plurality of entities where the first plurality of entities are associated with a first tenant and the first tenant is associated with M entities, where M>P>1 and the set of P byte arrays are indexed by tenant identifier and group identifier pairs, storing within the cache comprising:

receiving the M entities, dividing the M entities into a set of initial groups so that each initial group comprises a sub-set of M entities, splitting at least one initial group into multiple initial groups using an undirected, weighted graph comprising vertices representing the M entities and edges representing relationships between the M entities, each edge having a weight determined by the relationship between two of the M entities, and storing a map that associates each of the M entities with one of the initial groups;

receiving a first request from the first tenant, the first request being associated with a first entity in the first plurality of entities;

for the first entity in the first plurality of entities, retrieving, from the cache, the first byte array by indexing at least a first subset of the P byte arrays using a tenant identifier of the first tenant and a first group identifier from a set of first group identifiers wherein the first group identifier is associated with the first entity;

generating a first map from the first byte array, the first map comprising first metadata that defines properties and logic associated with the first entity; and processing at least a portion of the first request using the first metadata.

14. The system of claim 13, wherein the first entity has an association to a second entity and wherein the second entity is part of the first plurality of entities wherein the first map further comprises second metadata that defines properties and logic associated with the second entity and the processing at least a portion of the first request uses the second metadata.

15. The system of claim 13, wherein the first request is further associated with a second entity in a second plurality of entities further comprising:

for the second entity in the second plurality of entities, retrieving, from the cache, a second byte array by indexing at least a second subset of the P byte arrays using the tenant identifier and a second group identifier from the set of first group identifiers wherein the second group identifier is associated with the second entity;

generating a second map from the second byte array, the second map comprising second metadata that defines properties and logic associated with the second entity; and processing the at least a portion of the first request further using the second metadata.

16. The system of claim 14, wherein the first entity is associated with a second entity in a second plurality of entities, the method further comprising:

for the second entity in the second plurality of entities, retrieving, from the cache, a second byte array by indexing at least a second subset of the P byte arrays using the tenant identifier and a second group identifier from the set of first group identifiers wherein the second group identifier is associated with the second entity;

generating a second map from the second byte array, the second map comprising second metadata that defines properties and logic associated with the second entity; and processing the at least a portion of the first request further using the second metadata.

17. The non-transitory computer-readable storage medium of claim 8, where the relationship between two of the M entities is determined from access logs.

18. The non-transitory computer-readable storage medium of claim 8, wherein splitting the at least one initial group is executed in response to determining that the at least one initial group includes a number of entities that exceeds a threshold number of entities.

19. The system of claim 13, where the relationship between two of the M entities is determined from access logs.

20. The system of claim 13, wherein splitting the at least one initial group is executed in response to determining that the at least one initial group includes a number of entities that exceeds a threshold number of entities.

* * * * *